Aug. 17, 1937.　　　　　J. E. PADGETT　　　　　2,090,264
AUTOMATIC POWER TRANSMITTING MECHANISM
Filed June 19, 1933
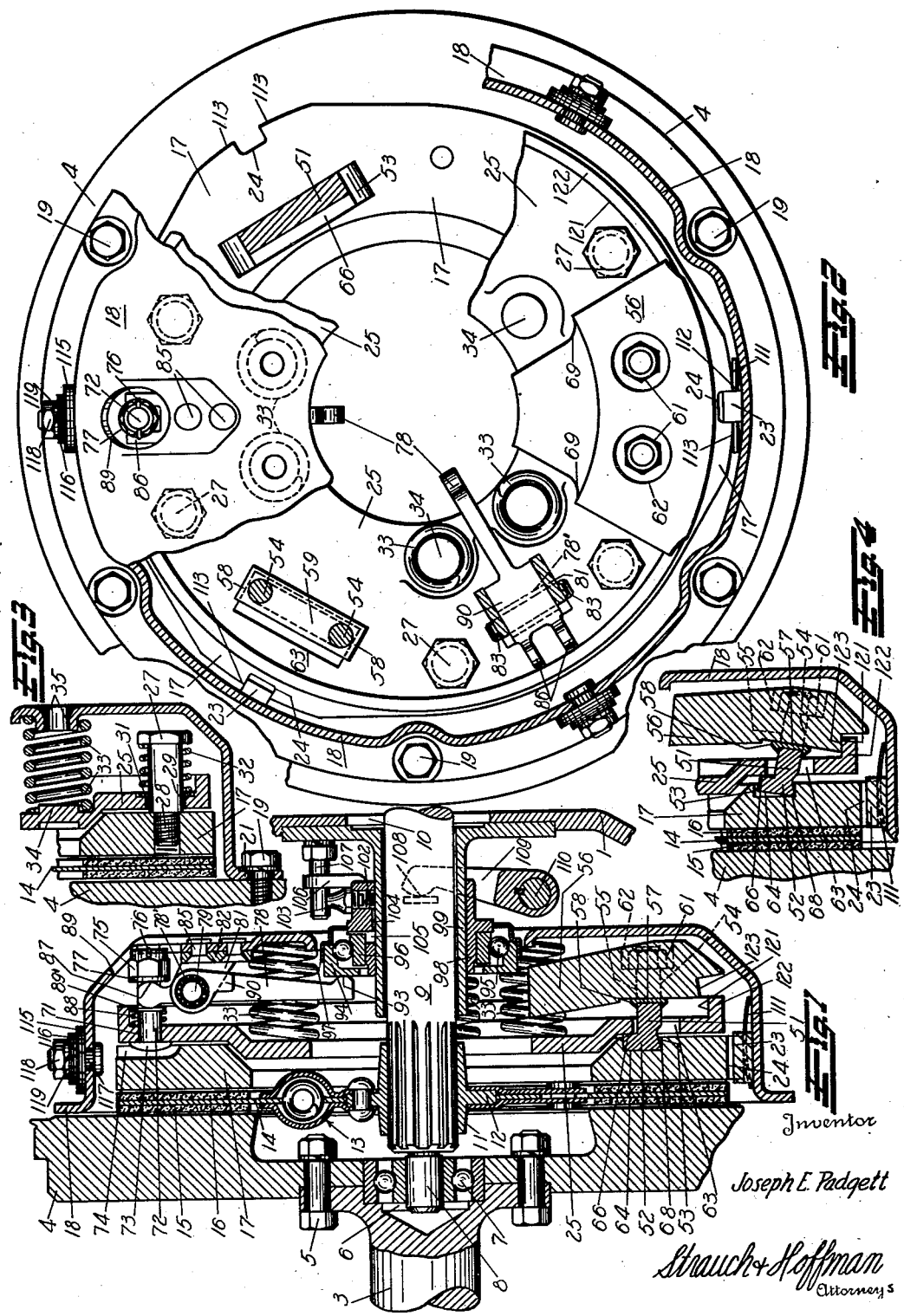
Inventor
Joseph E. Padgett
Strauch & Hoffman
Attorneys Patented Aug. 17, 1937

2,090,264

UNITED STATES PATENT OFFICE 2,090,264

AUTOMATIC POWER TRANSMITTING MECHANISM

Joseph E. Padgett, Toledo, Ohio, assignor to Automatic Drive & Transmission Company, Gloucester City, N. J., a corporation of New Jersey Application June 19, 1933, Serial No. 676,567

14 Claims. (Cl. 192—105)

The present invention relates to mechanisms for automatically transmitting power from a driving shaft to a driven shaft when the respective speeds of the shafts are properly correlated for efficient operation.

More particularly, the present invention relates to automatic clutch mechanisms, and although they possess operating characteristics and structural features that render them especially useful in automotive or like drives, they may be employed in a wide variety of power transmitting drives. The present invention also possesses many features that may be advantageously employed in manually operable clutch mechanisms and therefore the following description and claims are intended to embrace manual as well as automatic clutch mechanisms.

The present invention further has to do with novel methods and apparatus for statically and dynamically balancing clutch mechanisms, more particularly clutch mechanisms of the self operating or automatic type.

The present application is a continuation-in-part of my copending application Serial No. 669,766, filed May 6, 1932, which may be referred to for a more detailed disclosure of the automatic clutch mechanism to which my invention is applied.

In most all automatic clutch mechanisms heretofore proposed the speed responsive mechanism takes the form of a centrifugally operable device and as the latter is usually of comparatively large mass, it has been necessary to accurately design the parts, both for dimensional accuracy and mass distribution, in order to prevent the mechanism from becoming unbalanced in operation. It has been found, however, that producing clutch mechanisms in this manner has not only made them so costly of manufacture as to seriously militate against their commercial adoption but it often has resulted in production of mechanisms which, for some reason or other, are either statically or dynamically unbalanced or both.

Automatic clutch mechanisms heretofore proposed are also open to the objection that they embody plate, or plate and weight organizations of considerable mass which must move freely axially of the mechanism during operation, and in order to provide such movement driving key or lug organizations have been employed which have considerable play or lost motion, with the result that the plate, or plate and weight assemblies are allowed to shift radially or sidewise of the mechanism. Radial, or sidewise shifting of the plate or plate and weight assemblies has caused these prior mechanisms to be statically and dynamically unbalanced with the result that even when operating at moderately high speeds, they vibrate to an undesirable extent.

It is a primary object of the present invention to devise automatic clutch mechanisms which are statically as well as dynamically balanced at all times and whose operation is free from vibration.

It is a further major object of my invention to devise clutch mechanisms which are durable, efficient and statically and dynamically balanced during all phases of their operation; and yet which may be manufactured by low-cost, quantity production methods.

My invention further aims to devise a novel method of balancing clutch mechanisms which consists of manufacturing clutch mechanisms without regard to the precise dimensioning of the parts so as to provide dynamic or static balance, and then operating upon the assembled mechanisms to establish dynamic as well as static balance thereof.

It is a further important object of the present invention to devise; for use in clutch mechanisms of the type wherein parts thereof are mounted for free axial movement, and which have sufficient lost motion or play to allow them to shift radially; novel mechanism for establishing and maintaining accurate balance of the mechanisms at all times, whereby smoothly operating clutch mechanisms are produced.

Another object of my invention is to devise a novel method of establishing and maintaining accurate dynamic and static balance of clutch mechanisms of the type having axially movable members which are provided with play or lost motion permitting them to move sidewise, which comprises taking up the lost motion and balancing the mechanism, and then providing the mechanism parts with means for yieldingly holding them in balanced condition during all phases of their operation.

Another object of my invention is to devise a novel method of balancing clutch mechanisms of the type having two major elements which may be unbalanced; which comprises substantially or completely balancing one of the elements; assembling the mechanism, and then balancing the mechanism as a whole.

Further objects of the present invention will become apparent as the specification proceeds in connection with the annexed drawing and from the appended claims.

In the drawing:

Figure 1 is a longitudinal view of the automatic clutch mechanism forming part of my invention.

Figure 2 is a view of the clutch mechanism shown in Figure 1 as it appears when viewed from the right hand side of that figure with the throwout mechanism removed and parts in section to more clearly illustrate the structure involved.

Figure 3 is a fragmental sectional view of the clutch mechanism shown in Figure 1 and illustrates the manner of mounting the holdback and driving pressure springs in the mechanism; and Figure 4 is a fragmental sectional view of the mechanism shown in Figure 1 and illustrates one of the automatic weights disposed in its outermost position, and the plates automatically engaged.

Referring to the drawing, wherein like reference characters refer to like parts throughout the several views thereof, my automatic clutch mechanism is preferably enclosed in a clutch housing that is illustrated as broken away for the most part, and it is designated by the reference character 1.

A driving shaft 3 is adapted to have rotational efforts applied to it by a suitable prime mover in any desired manner, and in the present instance, it is shown as constituting the crank shaft of an internal combustion engine. The end of the shaft 3 is secured to a flywheel 4 by bolts 5, or in any other suitable manner. Bolts 5 extend through aligned apertures in the flywheel and the flange provided on the end of shaft 3, and have nuts turned thereon.

Shaft 3 is further provided with a bore 6 in which is carried a bearing assembly 7 for supporting the reduced end 8 of a clutch shaft 9. The rear end of shaft 9 is adapted to be journaled in a bearing assembly (not shown) that is preferably located in recess 10 in housing 1.

A hub 11 is splined upon shaft 9 and is provided with a flange 12. Operatively secured to flange 12, by means of rivets or the like, is a vibration dampener designated generally by reference character 13 which provides a resilient driving connection between hub 11 and a driven disc 14. This vibration dampener is employed to dampen out any torsional vibrations that may be set up in the crank shaft of the engine, and in view of the fact that it forms no part of the present invention, it will not be further described.

Facings 15 and 16 are secured to opposite sides of disk 14 near its periphery, and they may consist of any material that has the required characteristics to give the correct frictional gripping force, and at the same time has wearing qualities adapting it for this purpose. I prefer, however, to use the types of material which in practice have given very satisfactory results in automatic slipping drive and clutch mechanisms of the "Powerflo" type. Frictional facings 15 and 16 may be secured to disk 14 in any suitable manner, as for instance by rivets or the like, and they, along with disk 14, will be hereinafter referred to as the driven member. Facings may be annular discs, or they may be formed as segments and secured to disc 14 in circularly spaced relation, in order to provide a flow of cooling air currents if desired.

Facing 15, secured to disk 14, cooperates with the flat driving face of flywheel 4 and is adapted to be frictionally driven thereby. Facing 16, cooperates with a plate 17, which will be hereinafter termed the automatic plate for the reason that it is automatically actuated and is adapted to engage and clamp the driven member between it and the flat face of the flywheel. Plate 17 is of substantial thickness so that it may possess a sufficient degree of rigidity to prevent undesirable distortion and warpage thereof under the pressures and temperatures that it is subjected to during operation of the mechanism.

A cover member 18 is secured to the flywheel by means of cap screws 19, and it is provided with embossed portions 21 in the regions of cap screws 19, for the purpose of spacing the cover from the flywheel for a purpose that will presently appear. Secured to the inner walls of cover 18, by means of a spot welding operation or the like, are three symmetrically arranged lug or key members 23. Key members 23 are received in, and cooperate with the walls of recesses 24 formed in automatic plate 17 to establish a driving connection between flywheel 4 and the automatic plate.

Disposed parallel to plate 17 is a plate 25, and it will be hereinafter referred to as a reaction plate, because it takes the reaction of the speed-responsive mechanism in a manner to be presently described. Reaction plate 25 is driven by automatic plate 17 through the medium of a plurality of cap screws 27. Referring particularly to Figure 3, each cap screw 27 is provided with a reduced end 28 that is threaded into automatic plate 17, and the thread employed is preferably of the Dordelet or other self-locking type so as to prevent the cap screws from working loose in operation. Cap screws 27 extend through, and lie in slidable driving engagement with the walls of recesses 29 formed in reaction plate 25, and are encircled by washers 31 and compression springs 32. Springs 32 act against the heads of screws 27 and react against plate 25, to thereby urge the automatic and reaction plates toward each other at all times, and they will be hereinafter referred to as holdback springs. The holdback spring assemblies are preferably symmetrically disposed in pairs about the periphery of the plates and in the present instance six are employed, but it is to be understood that more or less than six properly designed holdback spring assemblies may be used if desired without in any way departing from the spirit of my invention. The holdback assemblies accordingly establish a driving connection between the automatic and reaction plates, and, at the same time, resiliently urge the latter toward each other.

Reaction plate 25 is normally urged toward the flywheel by a plurality of compression springs 33, that are retained in position against plate 25 by means of bosses 34 formed on the latter. Springs 33 react against the surface of cover 18, and are centered thereon by means of pressed out portions 35 formed in cover 18. Springs 33 are preferably six in number and are disposed in substantially common radii with the holdback assemblies. Reaction plate 25, however, is normally held in the position shown in Figure 1, when the driving shaft is operating at or below the idling speed of the engine or other prime mover, by means of a throwout mechanism that will presently be described.

Before proceeding to the description of the actuating mechanism for the automatic plate, it should be understood, that although I have illustrated the surfaces that engage facings 15 and 16 as plane in configuration, they may be grooved in the manner shown in my copending application Serial No. 669,766 if desired.

The automatic and reaction plates may be actuated away from each other by any suitable speed-responsive mechanism, to produce clutch engagement, but in the present embodiment of my invention, it preferably takes the form of centrifugally operable mechanism. Preferably three weight levers 51, having integrally formed heads 52, are symmetrically arranged between the pairs of pressure springs 33, and have their heads 52 received in rectangular recesses 53 formed in automatic plate 17.

Each lever 51 is provided with a pair of threaded portions 54, which are received in a pair of apertures 55 located in a weight element 56. A reinforcing element 57 is disposed between each weight 56 and lever 51, and is provided with portions 58 that embrace the sides of lever 51, and a flat surface 59 that is adapted to abut the surface of weight 56. Weight 56 and member 57 are held in place on lever 51 by means of nuts 61, turned on portions 54, and seating in countersinks 62 formed in weight 56. When nuts 61 are turned home, the parts are rigidly clamped in assembled condition and portions 58 of member 57 cooperate with lever 51 to prevent angular movement of the latter with respect to weight 56. Although I prefer to secure levers 51 to weights 56 in the manner just described, it is to be understood that the weights may be integrally formed with the levers if desired, without departing from the spirit of my invention.

Levers 51 are of substantial width and extend through recesses 63 formed in reaction plate 25. Heads 52 are provided with flat faces 64 that normally abut the bottoms of recesses 53 when the driving shaft is operating at, or below idling speed, and by the term "idling speed", I mean the particular desired automatic uncoupling or disengaging speed of the driven shaft, and if an internal combustion engine is employed as the prime mover, the idling speed will lie in the neighborhood of four hundred to five hundred revolutions per minute.

Heads 52 are also provided with reaction faces 66 which abut the face of reaction plate 25 at all times, and are designed for fulcruming engagement therewith during operation of the weights. The surface of plate 25 that cooperates with faces 66 of weight-heads 52 is preferably ground and polished so that relative sliding movement thereof may occur with a minimum of friction.

Heads 52 have their outer sides relieved to provide knife-like edges 68 which are adapted to rock or pivot in the dihedral angles defined by the bottom and outer faces of recesses 53 formed in automatic plate 17. The relieving operation enables a good knife edge 68 to be formed on each weight head, and allows pivotal movement thereof without interference from the outer side walls of recesses 53. However, it is to be understood that unrelieved weights may be employed in recesses that are suitably designed so as to have relieved outer side walls, if desired. It is also to be understood that, instead of providing individual recesses 53 for cooperation with the weight heads, a single annular groove, as shown in my copending application, Serial No. 660,179, filed March 9, 1933, may be formed in automatic plate 17 if desired, without departing from the spirit of the present invention.

Recesses 53 are formed in automatic plate 17 in any desired manner, as for instance by a milling cutter or the like, and weight heads 52 are prevented from moving longitudinally within the recesses so formed, by the engagement of the walls of recesses 63 formed in plate 25, with the sides of levers 51. Heads 52 fit rather snugly between the inner and outer side walls of recesses 53 so that they are restrained from shifting bodily inwardly or outwardly, thereby insuring dynamic balance of the mechanism at all times. Knife edges 68 are adapted to cooperate with the flat bottom faces of recesses 53 and thereby act in line contact upon plate 17 for a substantial distance across the face thereof, whereby uniform distribution of pressure over a substantial area thereof is effected. Each weight 56 is further provided with recesses 69 which allow free operation thereof without interference from bolts 27 and springs 33.

The seats formed by the bottom and outer faces or walls of recesses 53 constitute bearing recesses in which edges 68 of weight heads 52 are adapted to fulcrum, and although I prefer to employ this arrangement, it is to be understood that the relation of the parts may be reversed, and the bearing recesses formed in weight heads 52, and the knife edges formed on plate 17, or a member or members secured thereto, if desired, without departing from the spirit of the present invention.

The mass of weights 56, and the number of weights and lever assemblies employed in a particular installation, is determined by a consideration of the required pressure that they must transmit under the desired speed conditions to urge the clutch plates into final non-slipping engagement. In the automatic drive clutch mechanism shown, three equally spaced weight assemblies are preferably employed.

When shaft 3 is stationary, or is operating at, or below, a speed corresponding substantially to the idling speed of the prime mover employed to drive it, the parts assume the positions in which they are shown in Figure 1. Heads 52 of levers 51 are clamped between plates 17 and 25, under the influence of springs 33 acting against plate 25 and cap screws 27, and plate 25 is held in the position shown, against the action of springs 32, by means of a throwout mechanism that will be described hereinafter.

Extending through apertures 71 formed in plate 25, and preferably symmetrically disposed between the weight assemblies, are a plurality of bolts 72. The heads of bolts 72 are provided with blade-like portions 73 which seat in recesses 74 located in plate 25 and serve to hold bolts 72 against rotation. Castle nuts 75 are threaded on bolts 72 and are adapted to be held in adjusted positions thereon by means of cotter pins 76. Hardened washers 77 are disposed on bolts 72 and cooperate with clutch fingers 78 to produce movement of plate 25 away from the flywheel. Fingers 78 are pivoted on roller or needle bearings 78' journaled on pins 79 secured in spaced ears 81 formed on bracket members 82. Pins 79 are preferably held in position in ears 81 by means of cotter pins 83, and brackets 82 are secured against pressed in portions 84 by means of rivets 85 or the like. Fingers 78 are provided with bifurcated portions 86, and the latter have curved faces 87, that cooperate with washers 77 in a manner to be presently described. Bolts 72 are also encircled by light compression springs 88 and washers 89' and the latter are urged into contact with levers 78 to hold the latter against rattling when they are not under the influence of springs 33.

Bolts 72 and nuts 75 are adapted to partially extend through apertures 89 formed in cover 18, and the apertures are preferably of a size sufficient to allow a wrench or the like to be applied to nuts 75 for clutch adjustment purposes.

Levers 78 are provided with weight or mass portions 90, which function to balance the levers and prevent them from responding to centrifugal force and tend to impart declutching movements to the clutch parts.

Movement of the inner ends of fingers 78 to the left, in Figure 1, through the intermediary of bolts 72, causes movement of plate 25 away from the flywheel against the action of springs 33. Movement of the reaction plate produces similar movement of plate 17 because the holdback assemblies hold the two plates in unitary relationship at all times. Fingers 78 are adapted to be actuated in this manner by means of a throwout assembly that will now be described.

Cooperating with curved faces 93 formed on fingers 78 is the flat face of a ball race 94, which cooperates with anti-friction balls 95 disposed between race 94 and a cooperating ball race 96. Ball races 94 and 96 are held in assembled relation with respect to each other by means of a combined retainer and reservoir defining member 97. Ball race 96 is rigidly mounted upon a sleeve 98 which is slidably mounted upon a hollow supporting member 99. The latter is preferably integrally formed with housing 1 and is accurately machined to be disposed in axial alignment with the clutch mechanism and prime mover shaft 3 when the clutch is assembled, and is designed to provide a close sliding fit with sleeve 98. Member 99 is preferably spaced substantially from, and is independent of, shaft 9. Sleeve 98 is provided with a tapped bore 102 into which a grease fitting 103 of well known construction is screwed. Bore 102 communicates with an axially extending passage 104 formed in sleeve 98 so that lubricant introduced through bore 102 provides lubrication for axial movements of sleeve 98 and also provides lubrication for the bearing assembly through a passage 105 communicating with passage 104 and reservoir defining member 97 associated with the bearing assembly.

Sleeve 98 is prevented from rotating about support 99 by means of an apertured lug 106 formed on sleeve 98. A stud 107 is slidably received in lug 106 and is threaded into an aperture in housing 1. Formed on opposite sides of sleeve 98 are lugs 108 which cooperate with throwout fingers 109 rigidly carried by a throwout shaft 110. Shaft 110 is preferably journaled in, and extends outwardly of clutch housing 1 and carries on the end thereof a clutch pedal, (not shown) which is secured against rotation thereon.

Although I have disclosed a specific throwout assembly in connection with my invention, it is to be understood that any suitable throwout mechanism having a face that is substantially normal to the clutch axis for cooperating with the inner ends of fingers 78 may be employed if desired, and a thoroughly practical mechanism obtained.

Before proceeding to further structure, it should be observed that the greater length of driven shaft 9 is clear of supporting sleeve 99, the latter being stationarily mounted in the clutch housing or casing. Therefore, substantial eccentric, or angular misalignment of driving shaft 3 and driven shaft 9 can have no effect whatever upon the cooperation of the throwout bearing assembly and its cooperation with fingers 78. Moreover, since driving shaft 3, in the present instance, is the crank shaft of the engine, and the bearing face of support 99 is carefully machined to lie exactly parallel to driving shaft 3, their permanent alignment is assured and the throwout bearing assembly, providing nuts 75 are properly adjusted, causes plate 17 to be disposed in proper angular relation to the flywheel face at all times, regardless of whether the clutch is engaged or disengaged. Moreover, fingers 78 will be held tight at all times, regardless of manufacturing inaccuracies, or inaccuracies that arise due to wear, by their three-point support on the face of the throwout bearing assembly while the throwout bearing is positively maintained in proper alignment by virtue of the stationary guiding means formed on the clutch housing, providing smooth clutch action with minimum pedal operating pressures at all times in a low cost construction requiring a minimum of manufacturing accuracy.

With reference to the automatic and reaction plates, it is observed that they are "keyed" together, or connected together for synchronous rotation by means of the holdback assemblies, and reaction plate 25 is in fact carried by automatic plate 17. Weights 56 are also carried by the automatic plate, and as this weight and plate organization is of comparatively great mass, movement thereof radially or in any direction other than parallel to the axis of the mechanism, results in static as well as dynamic unbalance thereof, and as a matter of fact it has been found in practice, that for the clutch mechanism illustrated, a radial, or sidewise movement of four one-thousandths of an inch represents approximately two inch-ounces tending to unbalance the mechanism.

In order for the plate and weight assembly to function properly, it must be capable of undergoing free axial movement. By designing driving lugs 23 and recesses 24 so as to provide sufficient play to permit this action, sufficient lost motion is usually introduced into the plate organization to permit it to undergo a slight radial movement, and this results in the unbalanced condition just described.

In order to eliminate this difficulty, the plate and weight organization is so designed, that it is in substantial or complete static and dynamic balance when the automatic plate is located on one side of the mechanism, i. e., with the walls of recesses 24 in close contact with two of the driving lugs 23, and means are provided for maintaining the assembly in this condition during all phases of operation of the mechanism, with the result that it is balanced at all times. The specific form of means for producing this result may take any form desired, but in the present embodiment of my invention, it consists of a bowed leaf spring 111, having an aperture 112, which fits over and is held in place by one of the driving lugs 23. In view of the simple design of the present clutch mechanism, the parts thereof may be manufactured by low-cost, quantity production methods, and yet provide plate and weight organizations whose mass is fairly symmetrically distributed. However, if desired, masses, in the form of washers or the like may, if desired, be secured to parts of the mechanism for the purpose of balancing the weight and plate assembly when the latter is held in position against two of the driving lugs, and the appended claims are intended to embrace this method of balancing the mechanism. However I prefer to compensate for unbalance of the parts by mechanism located externally of the clutch, in the manner to be hereinafter described, so that it may be balanced after it has been assembled.

In view of the fact that spring 111 exerts a frictional resistance against only one side of plate 17, engaging and disengaging movements of the latter axially of the mechanism are yieldingly resisted or retarded to some extent, which may result in the automatic plate tilting slightly as it undergoes movement into and out of engagement with facing 16. This is an advantage rather than a disadvantage, however, because the slight tilting action which takes place is not sufficient to unbalance the mechanism, especially at the comparatively low speed at which engagement occurs, and the resulting initial partial and progressive engagement of automatic plate 17 with facing 16, as weights 56 rock outwardly, imparts extremely smooth operating characteristics to the mechanism and gives a "cushion disc" effect. When the clutch is fully engaged, the plates are not tilted, but are disposed parallel to each other and normal to the axis of the mechanism, so that the mechanism does not vibrate, even at high speeds.

In the particular clutch mechanism illustrated, spring 111 preferably exerts a force of approximately thirty pounds, and is designed to urge the automatic plate toward the other lug assemblies and serves to take up the "play" or lost motion therein. Spring 111 acts against and applies pressure to portions 113 of plate 17, located either side of recesses 24.

Spring 111 accordingly maintains the parts in balanced condition at all times, and yet, in view of its resilient nature, it does not interfere with free axial and slight tilting movements of automatic plate 17. Although I prefer to employ a spring of the type disclosed for holding the parts in balanced condition, it is to be understood that a tension or compression spring, or any other suitable means, may be employed to produce this result, without departing from the spirit of the present invention.

In order to provide dynamic and static balance of the mechanism as a whole, I provide balance assemblies which are preferably secured to the outer cylindrical portion of cover 18, and they are preferably symmetrically located between the weight assemblies or radially outwardly beyond levers 78. Each balance assembly preferably consists of a pair of main or principal weight members 115, which take the form of washers; and a plurality of auxiliary weight members 116 which consist of small washers in the present embodiment of the invention; which we held in place by means of a bolt 117, passing through an aperture in cover 18, a nut 118 and a lock washer 119.

The mass of the balance assemblies depends upon the nature of the particular clutch mechanism and the dimensions and mass of the parts thereof. In the particular clutch illustrated, three symmetrically arranged balance assemblies of the size shown are employed and their mass is such as to offset the concentrated mass represented by the weight assemblies and render the mechanism both statically and dynamically balanced. In the event that after the balance assemblies are applied to the mechanism, the latter is still out of either static or dynamic balance or both, because of unsymmetrical mass distribution caused by manufacture of the parts by low-cost, quantity production methods, one or more washers 119 may be removed from or added to one or more of the balance assemblies to bring about proper balance of the mechanism.

The provision of the present balance mechanism materially reduces the cost of producing clutch mechanisms of the manual or automatic type because their parts may be cheaply made without regard to their mass or dimensions, and if, upon assembling the mechanism, it is found that it is out of balance, either statically or dynamically, it can be readily brought into balance in the manner just described.

Although I have illustrated the balance assemblies as being secured to the cover, and prefer to utilize this type of organization because the mechanism can be balanced externally of the mechanism after it has been completely assembled, it is to be understood, that if desired, the balance assemblies may be secured to reaction plate 25 over any other part of the mechanism without departing from the spirit of the present invention, and the appended claims are intended to embrace mechanisms of this character. It is also to be understood that the use of the balance mechanism just described, as well as the balance spring employed to yieldingly position the automatic plate, is not limited to the particular type of automatic clutch illustrated, and that they may, in fact, be employed for balancing manually operable clutch mechanisms.

Clutch pedal shaft 110 is preferably adjustably held by a suitable mechanism in such a position that the throwout bearing assembly will hold the parts in the positions in which they are shown in Figure 1 when driving shaft 3 is stationary or is operating at, or below, a predetermined idling speed of the prime mover utilized therewith. Under these conditions, a clearance exists between the plates and there is accordingly no driving connection between shafts 3 and 9. Any suitable latch mechanism may be associated with shaft 110 or the clutch pedal for holding shaft 110 in this position, but I preferably employ the type of clutch pedal latch mechanism disclosed in my copending application, Serial No. 660,179, filed March 9, 1933, and which may be referred to for a full disclosure thereof. The throwout bearing assembly is shown in Figure 1 in what is termed its "automatic" position, and is so termed because it is preferably disposed in this position when the clutch mechanism functions, or is being employed as an automatic or speed-responsive clutch.

The clutch pedal may be depressed to move the throwout bearing assembly to the left of the position shown in Figure 1, for manually declutching the mechanism in a manner to be hereinafter pointed out, and the parts of the latch mechanism are so designed to allow this movement of the pedal without interference.

The latch mechanism may be operated to allow the clutch pedal to retract and permit the throwout bearing to move to the right of the position illustrated in Figure 1, into what is termed its manually engaged position.

With the throwout mechanism disposed in automatic position, the speed-responsive, or automatic, operation of the mechanism is as follows:

*Automatic operation*

As driving shaft 3, and flywheel 4 are accelerated, weights 56 gradually swing or rock outwardly about their knife-edges 68 as axes in response to centrifugal force. As this occurs, reaction faces 66 of heads 52 fulcrum and slide on the face of plate 25 and knife edges 68, and by virtue of their engagement and fulcruming action upon the flat bottom surfaces of recesses 53 located in automatic plate 17, they force automatic plate 17 away from reaction plate 25 against the action of holdback springs 32, and into engagement with facing 16 of disk 14, on a three-point support, thus causing disk 14 to move axially and bring the facing 15 thereof into contact with the flywheel face.

Movement of automatic plate 17 away from reaction member 25 is opposed by holdback springs 32, and therefore weights 56 are held under control. Holdback springs 32, therefore, in addition to predetermining the speed of the mechanism at which automatic engaging operation is initiated, exert a steadying influence upon the clutch parts.

After the driven member is thus frictionally clamped or gripped between automatic plate 17 and flywheel 4, movement of plate 17 is substantially arrested, and further rocking movement of weights 56, in response to a further increase in centrifugal force, causes faces 66 of heads 52 to force reaction plate 25 away from the flywheel against the action of springs 33. Movement of plate 25 in this manner causes pressure to slowly build up in springs 33, and a corresponding pressure is built up between the edges 68 of heads 52, and the bottoms of the recesses in automatic plate 17.

It is observed that fulcrums 68 of weight heads 52 are disposed approximately midway of the outer and inner peripheries of plate 17, and act in line contact therewith for a substantial distance across its face, applying substantially uniformly distributed pressures opposite the center of its engaging or working area, thereby minimizing warping and distorting tendencies of the plate under the pressures and temperatures to which it is subjected during operation.

The partial vacuum established by rotation of the parts causes an air stream to be drawn through the relatively large annular passage between cover 18 and the throwout bearing and along the clutch axis. A part of the axial air stream passes over both faces of plate 25 and between plates 25 and 17, and in this connection, it should be observed that plates 17 and 25 are substantially thermally isolated, and the air currents passing between them effectively prevent the heat that is generated in plate 17, as the result of slipping, from being transmitted to plate 25, and possibly drawing or harmfully modifying the temper of springs 32 and 33 associated with the latter. Another portion of the air stream passes outwardly between the plates and the heated, dust-laden air is exhausted from the mechanism through the space between the flywheel and cover 18. If desired, additional openings may be formed in the cylindrical portion of cover 18 for assisting in exhausting the heated dust-laden air from the mechanism, and fan blades or the like associated therewith for drawing the air through the openings.

The ventilating and dust-removing air may be introduced into, and exhausted from housing 1 in any desired manner, but I preferably contemplate the use of the organizations disclosed in application Serial No. 606,238, filed April 19, 1932, which have proved to be extremely efficient in practice.

When shaft 3 and flywheel 4 attain a predetermined speed, weights 56 rock out into contact with arcuately shaped stop faces 121 formed on boss portions 122 of plate 25, as seen in Figure 4. In order to stop weights 56 in a definite plane that is normal to the mechanism, and thus insure dynamic balance of the device, preferably arcuately shaped stop-edges or faces 123 are accurately formed on weights 56. The stops are also designed to stop weights 56 with their centers of mass equidistant from the axis of the mechanism. When the weights have moved into their outermost positions with their stop faces 123 in contact with stop faces 121, the plates are disposed in non-slipping engagement and further acceleration of shaft 3 is ineffective to cause a further pressure to be built up between the plates. The plates are thereby held in non-slipping engagement under a predetermined pressure, and a positive friction coupling exists between shafts 3 and 9.

Stop faces 123 are so located on weights 56, that no matter how great the magnitude of the centrifugal force set up in weights 56 may be, it is incapable of causing the mechanism to exhibit declutching tendencies at high speeds.

With reference to levers 78, they are designed so that, when the clutch is engaged, the masses thereof are so located with respect to their pivots, that the centrifugal forces set up therein, as the result of rotation of the mechanism, do not exert substantial rotative influences in the levers. When the parts are disposed in automatic idling position (Figure 1) the greater portion of the masses of levers 78, is located to the right of their pivots, but this is not a disadvantage, however, because the parts only assume these positions when the mechanism is rotating at low speeds, and the centrifugal forces existing under these conditions are likewise of low magnitude.

When the clutch has been automatically engaged in the manner just described, the inner ends of levers 78 move away from the throwout assembly, and the inner ends of the levers are spaced a substantial distance from the latter. This is brought about through movement of reaction plate 25 to the right, and the levers are held in this position under the influence of springs 88 so long as the clutch is in full automatic engagement. Weight portions 90 are so related with levers 78 that, when the clutch is automatically engaged, the centrifugal forces set up in them, each side of a plane normal to the axis of the mechanism and passing through their axes, are approximately equal, so that they will not undergo rotative tendencies. If levers 78, in response to centrifugal force, exhibited tendencies to rotate so as to move their inner ends to the left, the levers would transmit declutching forces to the reaction plate. However, if the levers should be designed so that they tended to rotate and bring their inner ends toward the throwout assembly in response to centrifugal forces set up therein, such movement would be ineffective to modify the plate pressure established by the action of weights 56, because faces 87 of levers 78 would merely move away from washers 77, against the action of springs 88. Therefore, the prime requisite is that the levers, in response to centrifugal force, will not exhibit tendencies to move in such manner as to bring their inner ends away from the throwout assembly when the clutch mechanism is automatically engaged.

In view of the resilient nature of the backing means for the reaction member, should certain weights 56 swing further outwardly than the remaining weights, during the engaging operation, the pressure exerted by them is nevertheless uniformly distributed between the segments of plate 17 for the reason that reaction plate 25 can tilt or float, and take a slight angular position with respect to automatic plate 17, due to the fact that the sole movement limiting means of the reaction member is constituted by bolts 27, and the latter are designed to provide sufficient play or clearance to permit this tilting action.

When the automatic engaging operation, just described, is taking place, reaction plate 25, and its associated parts, are moved to the right of the positions in which they are shown in Figure 1. Movement of reaction plate 25 to the right allows springs 88 to move the inner ends of fingers 78 away from their cooperating engagement with the face of the bearing assembly, thereby relieving the throwout bearing assembly of pressure. The throwout bearing assembly therefore only operates when the clutch is operating at idling speeds or is manually declutched, and it therefore receives only a minimum amount of wear and its life is therefore greatly increased.

With the above described mechanism installed in a motor vehicle provided with a conventional three-speed transmission, and the vehicle is on a substantially level surface, the transmission may be placed in high gear without operating the clutch pedal if the engine is operating below the engaging speed of the clutch mechanism, and the engine may be accelerated to produce automatic clutch engagement in the manner previously described. During the engaging operation, a slipping drive exists between shafts 3 and 9 and the vehicle is accelerated smoothly and without shock and in view of the speed-responsive engaging characteristics of the mechanism, it is impossible to stall the engine through improper actuation of the accelerator. When the engine and vehicle speeds are properly correlated, the clutch plates are brought into full driving engagement, thereby automatically establishing a direct coupling between shafts 3 and 9.

When operating in this manner, and it is desired to decelerate or stop the vehicle, the accelerator is released and the brakes are applied. When the vehicle has decelerated to a speed corresponding substantially to engine idling speed, through the combined braking action of the engine and the vehicle brake mechanism, weights 56 rock inwardly under the influence of holdback springs 32 and disengagement of the clutch plates is automatically effected. Shafts 3 and 9 are thereby automatically uncoupled and the braking action of the engine is no longer transmitted to shaft 9, but in view of the fact that the disengaging speed of the clutch mechanism is usually fairly low, the vehicle is decelerated to a relatively low speed under the braking influence of the engine before the mechanism automatically disconnects shafts 3 and 9.

The vehicle may be brought to a complete stop by continued application of the brakes, or, if traffic conditions permit, the accelerator may be depressed and the engine accelerated to produce almost immediate re-engagement of the mechanism and the vehicle again picked up in high gear.

Due to its slipping drive characteristics, the present mechanism constitutes a drive mechanism as well as a clutch, and while it does not multiply the torque delivered from shaft 3 to shaft 9, it permits the engine to operate at a higher speed, and, consequently, at a higher point on its speed-torque curve, and deliver more power, than if substantially non-slipping conditions existed between shafts 3 and 9, and this feature, in combination with the lubricated facings, the novel plate structure, and the self-cooling characteristics of the present mechanism, renders it entirely feasible to operate vehicles in which they are incorporated in high gear under normal conditions.

As previously explained, a latch mechanism is adjusted to hold the parts in the positions shown in Figure 1 of the drawing, when the prime mover is operating at idling speed or is stationary. When the facings have become thin, as the result of particles thereof wearing away during operation, and cause the idle release plate clearance to become too great, the throwout bearing assembly is moved slightly to the right of the position in which it is shown in Figure 1, by adjusting the latch pedal on its shaft, or adjusting the latch mechanism in any suitable manner, in order to dispose automatic plate 17 closer to the flywheel and establish proper plate clearance for idle release conditions. In copending application, Serial No. 595,184, filed February 25, 1932, adjusting mechanisms are disclosed that have proved to be highly successful in practice, and I contemplate using these adjusting mechanisms in the present invention. When facing wear has been compensated for several times, by periodically adjusting the throwout bearing assembly further to the right, fingers or levers 78 may be allowed to move to the right to such an extent that, under some conditions they take undesirable angular positions. This condition is readily remedied, or compensated for, by adjusting nuts 75 an equal amount, and sufficient to bring levers 78 into the proper positions desired. The external adjusting mechanism previously referred to may then be manipulated to establish proper idle release clearance between the plates, and clearance gauges may be introduced between the cover and the flywheel and inserted between facing 15 and the flywheel face to ascertain if the plate clearance is correct. The normal plate wear compensating adjustment, however, is made externally of the clutch housing by adjusting the angular position of shaft 110 into proper automatic position, and therefore this adjustment does not in any way affect the adjusted positions of nuts 75, and consequently, the angular relation of the plates.

*Manual disengaging operation*

When the plates have been automatically brought into full driving engagement in the manner previously described, the clutch pedal may be depressed to displace the throwout bearing assembly and the inner ends of levers 78 to the left of the positions in which they are shown in Figure 1. Movement of levers 78 in this manner causes them to fulcrum about and react against bolts 71 and withdraw the reaction plate from the flywheel Withdrawal of the reaction plate produces withdrawal or disengagement of automatic plate 17 from the driven member because plates 17 and 25 are held in unitary relation by the holdback assemblies. If the engine speed is maintained above the predetermined engaging speed during the manual declutching operation, weights 56 remain in their outermost positions, therefore, the declutching operation does not involve retracting the weights against the action of centrifugal force, which, at high speeds might be sufficiently high to preclude affecting the manual declutching operation.

In traffic, when it is desired to get the vehicle away quickly, and in starting up steep grades, the clutch pedal may be operated in this manner to disengage the plates for gear shifting purposes as in a vehicle provided with a manually operable clutch. The clutch pedal may also be operated to produce manual engagement of the plates, (if the engine is operating above the engaging speed of the mechanism) in a manner similar to a manual clutch, for maneuvering the vehicle into and out of parking positions or for navigating in heavy traffic.

*Manual engaging operation*

As has been previously pointed out, when shaft 3 is operating substantially at the idling speed of the prime mover, or is stationary, and the clutch pedal is latched to dispose the throwout bearing in the automatic position shown in Figure 1, a clearance exists between the clutch plates, and shafts 3 and 9 are accordingly disconnected. When it is desired to establish a driving connection between shafts 3 and 9, under these conditions, the latch associated with the clutch pedal is actuated to allow the latter to move into its retracted position. Retraction of the clutch pedal allows the throwout bearing assembly to move to the right under the influence of springs 33, and the latter, acting against the reaction plate, bring reaction plate 25 and automatic plate 17 to the left of the positions in which they are shown in Figure 1, with automatic plate 17 in driving engagement with the driven member, thereby coupling shafts 3 and 9.

With the above described mechanism installed in a motor vehicle, it is frequently desirable to effect this manual engaging operation. For instance, when the motor is cold and the battery is low, it is desirable to place the transmission in gear and push or coast the vehicle to turn the engine over. Also when stopping on a steep grade, positive engagement of the clutch, with the transmission placed in low or reverse gear, provides an emergency brake that cannot be inadvertently released; or if the motor stalls, from lack of fuel or any other cause, the vehicle can pull out of dangerous positions by propelling it in low gear with the starting motor.

The present clutch mechanism is designed to be fully engaged when shaft 3 attains a speed of approximately one thousand revolutions per minute, and as the weights rock out into firm contact with their stops at this time, the only speed at which the mechanism may possibly become unbalanced is below one thousand revolutions per minute (as for instance by the weights moving outwardly unequally), but at this comparatively low speed, such unbalance, if it does exist, does not result in harmful vibration of the mechanism. Above one thousand revolutions per minute, where unbalance in the mechanism would possibly result in harmful vibration, it is maintained in accurate static and dynamic balance by means of the balancing mechanisms, and an extremely practical and effective mechanism is thereby produced.

Although I have disclosed, and prefer to employ clutch mechanisms of the "single plate" type, i. e., clutch mechanisms having two driving members and a single driven member, it is to be distinctly understood that my invention contemplates clutch mechanisms wherein three or more driving members cooperate with two or more driven members to effect a driving connection between the driving and driven shafts, and the appended claims are intended to embrace clutch mechanisms of this character.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a clutch mechanism, a clutch element; means mounting said element for movement into and out of a centrifugally balanced position; and means for yieldingly maintaining said element in said centrifugally balanced position.

2. The mechanism described in claim 1, together with balancing means associated with, and adapted to balance said mechanism, said balancing means being also adapted to exert balancing influences upon said element.

3. In a clutch mechanism, a driving member; a driving plate; means for causing said driving member to drive said driving plate and permitting the latter to move axially of the mechanism for clutching and declutching purposes, said means also permitting said driving plate to undergo relatively slight radial movements; and resilient means for yieldingly restraining said driving plate against radial movement.

4. In an automatic clutch mechanism, a driving member; an automatic plate; means for causing said driving member to drive said automatic plate and permitting the latter to undergo movement axially of the mechanism for clutching and declutching purposes, said means also permitting said automatic plate to undergo relatively slight radial movements; and resilient means for yieldingly restraining said driving plate against radial movement.

5. The automatic clutch mechanism described in claim 4, wherein speed-responsive means are carried by said automatic plate, and wherein said resilient means is operative to centrifugally balance the latter.

6. In a clutch mechanism of the type wherein a driving plate is mounted for axial movement, and is capable of slight radial movements, the method of establishing and maintaining the mechanism in balance at all times, which comprises, distributing the weight or mass of the plate so that it is balanced when disposed in one of its extreme radial positions, and resiliently urging the plate toward said one extreme radial position with a force sufficiently great to yieldingly maintain the plate in its balanced position at all times during normal operation of the clutch mechanism.

7. In an automatic clutch mechanism, rotatable driving and driven members mounted for engagement and disengagement; speed responsive means for forcing said members into frictional engagement; a plurality of levers for controlling engagement and disengagement of said members and mounted for rocking movement in planes disposed substantially radially with respect to the axis of rotation of said driving and driven members, said levers being automatically rockable into angular positions when said members are brought into engagement under the influence of said speed-responsive means; and means provided on said levers for centrifugally balancing them when they are disposed in said angular positions.

8. In a clutch mechanism, a supporting structure mounted for rotation; a frictional driving plate; means for establishing a driving connection between said supporting structure and said driving plate, comprising at least three lug elements connected to said supporting structure and engaging driving faces provided on said driving plate, said means permitting said driving plate to move axially of the mechanism for clutching and declutching purposes and also permitting said driving plate to undergo relatively slight radial movements; and at least one spring means acting upon said driving plate and yieldably restraining the latter against radial movement.

9. The clutch mechanism described in claim 8, wherein said means comprises a single spring located adjacent one of said lugs and bearing against the periphery of said driving plate.

10. In a clutch mechanism, a clutch element; means mounting said element for movement into and out of a dynamically balanced position; and means for yieldingly maintaining said element in said dynamically balanced position.

11. In a clutch mechanism, a driving member, a driving plate; means for causing said driving member to drive said driving plate and permitting the latter to move axially of the mechanism for clutching and declutching purposes, said means also permitting said driving plate to undergo relatively slight radial movements into and out of a dynamically balanced position, and resilient means for yieldingly restraining said driving plate against radial movement out of said dynamically balanced position.

12. In an automatic clutch mechanism, a driving member; an automatic plate; means for causing said driving member to drive said automatic plate and permitting the latter to undergo movement axially of the mechanism for clutching and declutching purposes, said means also permitting said automatic plate to undergo relatively slight radial movements into and out of a dynamically balanced position, and resilient means for yieldingly restraining said driving plate against radial movement out of said dyamically balanced position.

13. The automatic clutch mechanism described in claim 12, wherein speed-responsive means are carried by said automatic plate.

14. In a clutch mechanism of the type wherein a driving plate is mounted for axial movement, and is capable of slight radial movements, the method of establishing and maintaining the mechanism in dynamic balance at all times, which comprises, distributing the weight or mass of the plate so that it is balanced when disposed in one of its extreme radial positions, and providing the mechanism with means for yieldingly maintaining the plate in its balanced position.

JOSEPH E. PADGETT.